US011641436B2

(12) United States Patent
Tokunaga (10) Patent No.: US 11,641,436 B2
(45) Date of Patent: May 2, 2023

(54) ELECTRONIC DEVICE, AND NON-TRANSITORY COMPUTER-READABLE RECORDING MEDIUM RECORDING FIRMWARE

(71) Applicant: KYOCERA Document Solutions Inc., Osaka (JP)

(72) Inventor: Tomoharu Tokunaga, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 19 days.

(21) Appl. No.: 17/365,229

(22) Filed: Jul. 1, 2021

(65) Prior Publication Data

US 2022/0014640 A1 Jan. 13, 2022

(30) Foreign Application Priority Data

Jul. 9, 2020 (JP) .............................. JP2020-118212

(51) Int. Cl.
*H04N 1/00* (2006.01)
(52) U.S. Cl.
CPC .............................. *H04N 1/00973* (2013.01)
(58) Field of Classification Search
CPC ................................................ H04N 1/00973
See application file for complete search history.

(56) References Cited

U.S. PATENT DOCUMENTS

| | | | |
|---|---|---|---|
| 2009/0049541 A1* | 2/2009 | Ban | H04N 1/00326 726/17 |
| 2015/0350472 A1* | 12/2015 | Hirota | H04N 1/00962 358/1.13 |
| 2015/0350473 A1* | 12/2015 | Hirota | H04N 1/00962 358/1.13 |
| 2015/0373223 A1* | 12/2015 | Furushige | H04N 1/00347 358/1.13 |
| 2016/0014292 A1* | 1/2016 | Furushige | G06F 8/61 358/1.13 |
| 2017/0223208 A1* | 8/2017 | Okamoto | H04N 1/00411 |
| 2017/0371398 A1* | 12/2017 | Umimura | H04N 1/00885 |
| 2018/0091682 A1* | 3/2018 | Kamasuka | G06F 21/57 |
| 2019/0037107 A1* | 1/2019 | Mesa | G06F 21/44 |

FOREIGN PATENT DOCUMENTS

| | | | |
|---|---|---|---|
| WO | 2015/182303 | 12/2015 | |
| WO | WO-2015182303 A1 * | 12/2015 | ............... G06F 8/61 |

* cited by examiner

*Primary Examiner* — Ted W Barnes
(74) *Attorney, Agent, or Firm* — Lex IP Meister, PLLC

(57) ABSTRACT

In a case where a standard authentication system is being connected to an image forming device, a cooperation processing unit of the image forming device uses a set value managed by a set value management unit thereby to cooperate with the standard authentication system. In a case where an extension authentication system is being connected to the image forming device, the cooperation processing unit of the image forming device uses a set value managed by a set value management service, which is an extension service that provides a function other than a standard function of the electronic device, thereby to cooperate with the extension authentication system. A program for the cooperation processing unit and a program for the set value management unit are included in firmware of the image forming device. A set value management program for the set value management service is not included in the firmware.

5 Claims, 7 Drawing Sheets

ELECTRONIC DEVICE, AND NON-TRANSITORY COMPUTER-READABLE RECORDING MEDIUM RECORDING FIRMWARE

INCORPORATION BY REFERENCE

This application is based upon, and claims the benefit of priority from, corresponding Japanese Patent Application No. 2020-118212 filed in the Japan Patent Office on Jul. 9, 2020, the entire contents of which are incorporated herein by reference.

BACKGROUND

Field of the Invention

The present disclosure relates to an electronic device and firmware that cooperate with an external system.

Description of Related Art

Known as a typical electronic device include an image forming device that is provided with a standard application, which is an application that realizes standard functions of the image forming device, an extension application, which is an application that provides extended functions of standard functions of the image forming device to the extension application without using the standard application.

SUMMARY

An electronic device of the present disclosure is an electronic device that cooperates with an external system, and includes a cooperation processing unit that cooperates with the external system, a set value management unit that manages a set value for communication with the external system, and a set value management service that is an extension service for providing a function other than a standard function of the electronic device and that manages the set value for communication with the external system. In a case where a first external system as the external system is being connected to the electronic device, the cooperation processing unit uses the set value managed by the set value management unit thereby to cooperate with the first external system, and in a case where a second external system as the external system is being connected to the electronic device, the cooperation processing unit uses the set value managed by the set value management service thereby to cooperate with the second external system, a program for the cooperation processing unit and a program for the set value management unit are included in firmware of the electronic device, and a program for the extension service is not included in the firmware.

A non-transitory computer-readable recording medium of the present disclosure records firmware executable by a computer of an electronic device that cooperates with an external system. The firmware includes a program for a cooperation processing unit that cooperates with the external system, and a program for a set value management unit that manages a set value for communication with the external system. When the firmware is executed, the firmware causes the computer to operate as the cooperation processing unit and the set value management unit. In a case where a first external system as the external system is being connected to the electronic device, the cooperation processing unit uses the set value managed by the set value management unit thereby to cooperate with the first external system, and in a case where a second external system as the external system is being connected to the electronic device, the cooperation processing unit uses the set value managed by a set value management service, which is an extension service that provides a function other than a standard function of the electronic device and manages the set value for communication with the external system, thereby to cooperate with the second external system, and the firmware does not include a program for the extension service.

DETAILED DESCRIPTION

The following describes an embodiment of the present disclosure using the accompanying drawings.

First, the structure of a system according to an embodiment of the present disclosure is described.

Figure 1:
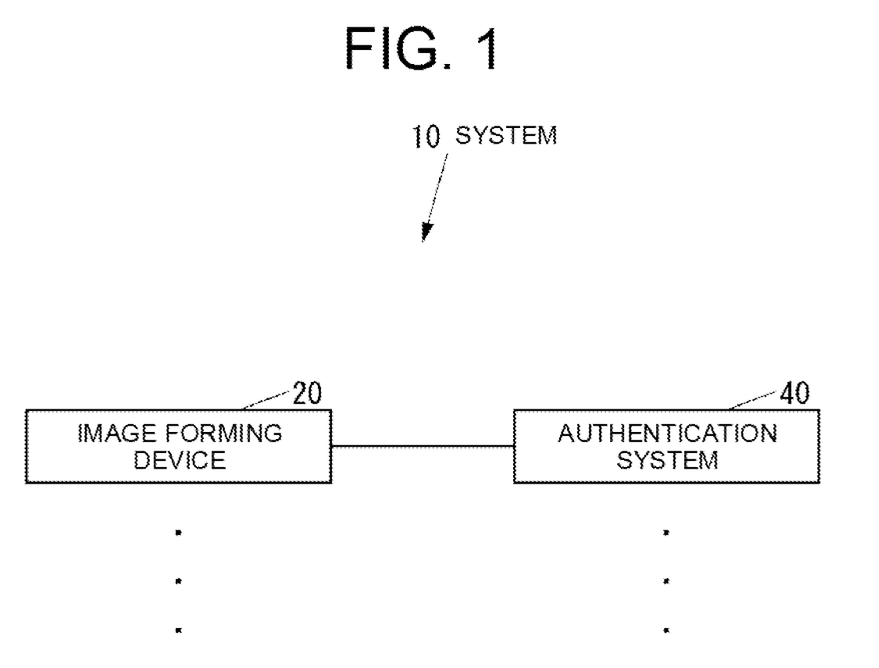
FIG. 1 is a block diagram of a system according to an embodiment of the present disclosure.

FIG. 1 is a block diagram of a system 10 according to the present embodiment.

As shown in FIG. 1, the system 10 has an image forming device 20 as electronic device. The image forming device 20 includes, for example, an MFP (Multifunction Peripheral), a dedicated printer machine. The system 10 can be provided with at least one image forming device similar in configuration to the image forming device 20, other than the image forming device 20.

The system 10 has an authentication system 40 as an external system of the image forming device 20. The authentication system 40 may include a single computer or a plurality of computers. The system 10 can be provided with at least one authentication system similar in configuration to the authentication system 40, other than the authentication system 40.

Figure 2:
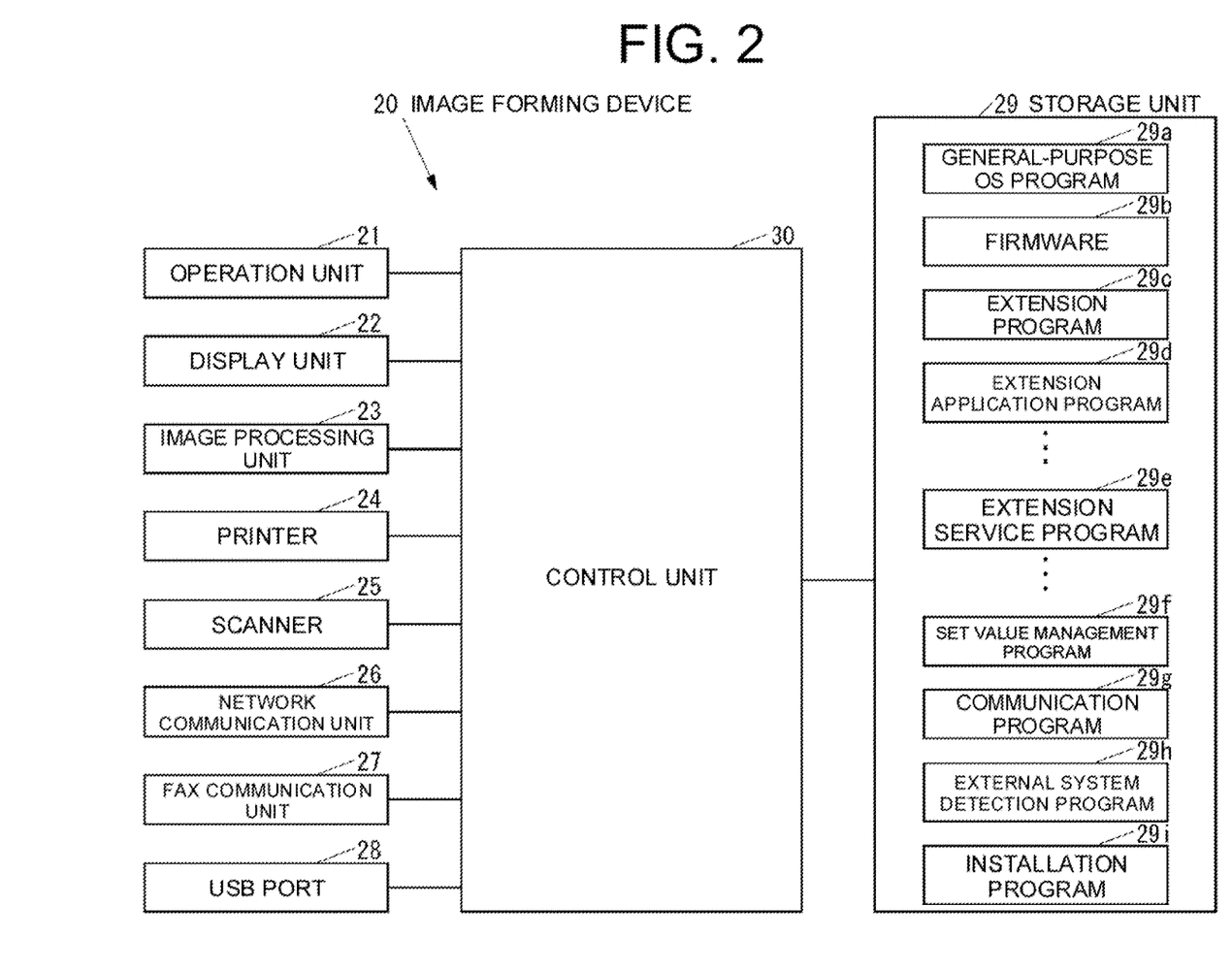
FIG. 2 is a block diagram of hardware of an image forming device when the image forming device is an MFP.

FIG. 2 is a block diagram of hardware of the image forming device 20 when the image forming device 20 is an MFP.

As shown in FIG. 2, the image forming device 20 includes an operation unit 21, which is an operation device such as, for example, a button for inputting various operations, a display unit 22, which is a display device such as, for example, an LCD (Liquid Crystal Display) for displaying various information, an image processing unit 23, which is an image processing device such as, for example, a GPU (Graphics Processing Unit) for executing various image processes on image data such as, for example, enlargement, reduction, density adjustment, tone adjustment, and image improvement on image data, a printer 24, which is a printing device that prints an image on a recording medium such as paper, a scanner 25, which is a reading device that reads an image from a document, a network communication unit 26, which is a communication device for communication with the external device via a network such as a LAN (Local Area Network) or the Internet, or directly by wired or wireless communication without going through the network, a fax communication unit 27, which is a fax device for making a communication with an external facsimile device (not shown) via a communication line such as a public telephone line, a USB (Universal Serial Bus) port 28, and a storage unit 29, which is a non-volatile storage device such as a semiconductor memory, HDD (Hard Disk Drive), etc., for storing various information, and a control unit 30 for controlling the entire image forming device 20.

The storage unit 29 stores a program for a general-purpose OS (Operating System) program 29*a* (hereinafter referred to as "general-purpose OS program") such as, for example, Linux (registered trademark) for controlling each hardware of the image forming device 20. The general-purpose OS program 29*a*, for example, may be installed on the image forming device 20 at the manufacturing stage of the image forming device 20, may be additionally installed on the image forming device 20 from an external storage medium such as CD (Compact Disk), DVD (Digital Versatile Disk), and USB stick, or may be additionally installed on the image forming device 20 from on the network.

The storage unit 29 stores firmware 29*b* of the image forming device 20. The firmware 29*b*, for example, may be installed on the image forming device 20 at the manufacturing stage of the image forming device 20, may be additionally installed on the image forming device 20 from the external storage medium such as CD, DVD, and USB stick, or may be additionally installed on the image forming device 20 from on the network.

The storage unit 29 stores an extension program 29*c*, which is a program for realizing a function other than the standard function of the image forming device 20. The extension program 29*c*, for example, may be installed on the image forming device 20 at the manufacturing stage of the image forming device 20, may be additionally installed on the image forming device 20 from the external storage medium such as CD, DVD, and USB stick, or may be additionally installed on the image forming device 20 from on the network.

The storage unit 29 stores an extension application program (hereinafter referred to as "extension application program") 29*d*, which is an application that realizes a function other than the standard function of the image forming device 20. The storage unit 29 can store the extension application program for each extension application. The extension application program, for example, may be installed on the image forming device 20 at the manufacturing stage of the image forming device 20, may be additionally installed on the image forming device 20 from the external storage medium such as CD, DVD, and USB stick, or may be additionally installed on the image forming device 20 from on the network.

The storage unit 29 stores an extension service program (hereinafter referred to as "extension service program") 29*e* that provides an extension application with a service that uses the general-purpose OS without using the standard application which is an application that realizes the standard function of the image forming device 20. The storage unit 29 can store the extension service program for each extension service. For example, the extension service programs include a set value management program 29*f* for a set value management service described below, which is an extension service for managing a set value for communication with the authentication system, a communication program 29*g* for a communication service described below, which is an extension service for communication with the authentication system, an external system detection program 29*h* for an external system detection service described below, which is an extension service for detecting the authentication system, and an installation program 29*i* for an installation service, which is an extension service for installing the set value management program 29*f*, the communication program 29*g*, and the external system detection program 29*h*. The extension service program, for example, may be installed on the image forming device 20 at the manufacturing stage of the image forming device 20, may be additionally installed on the image forming device 20 from the external storage medium such as CD, DVD, and USB stick, or may be additionally installed on the image forming device 20 from on the network.

The control unit 30 includes, for example, a CPU (Central Processing Unit), a ROM (Read Only Memory) storing a program and various data, and a RAM (Random Access Memory) as a memory used as a work area of the CPU. The CPU executes the program stored in the storage unit 29 or the ROM.

Figure 3:
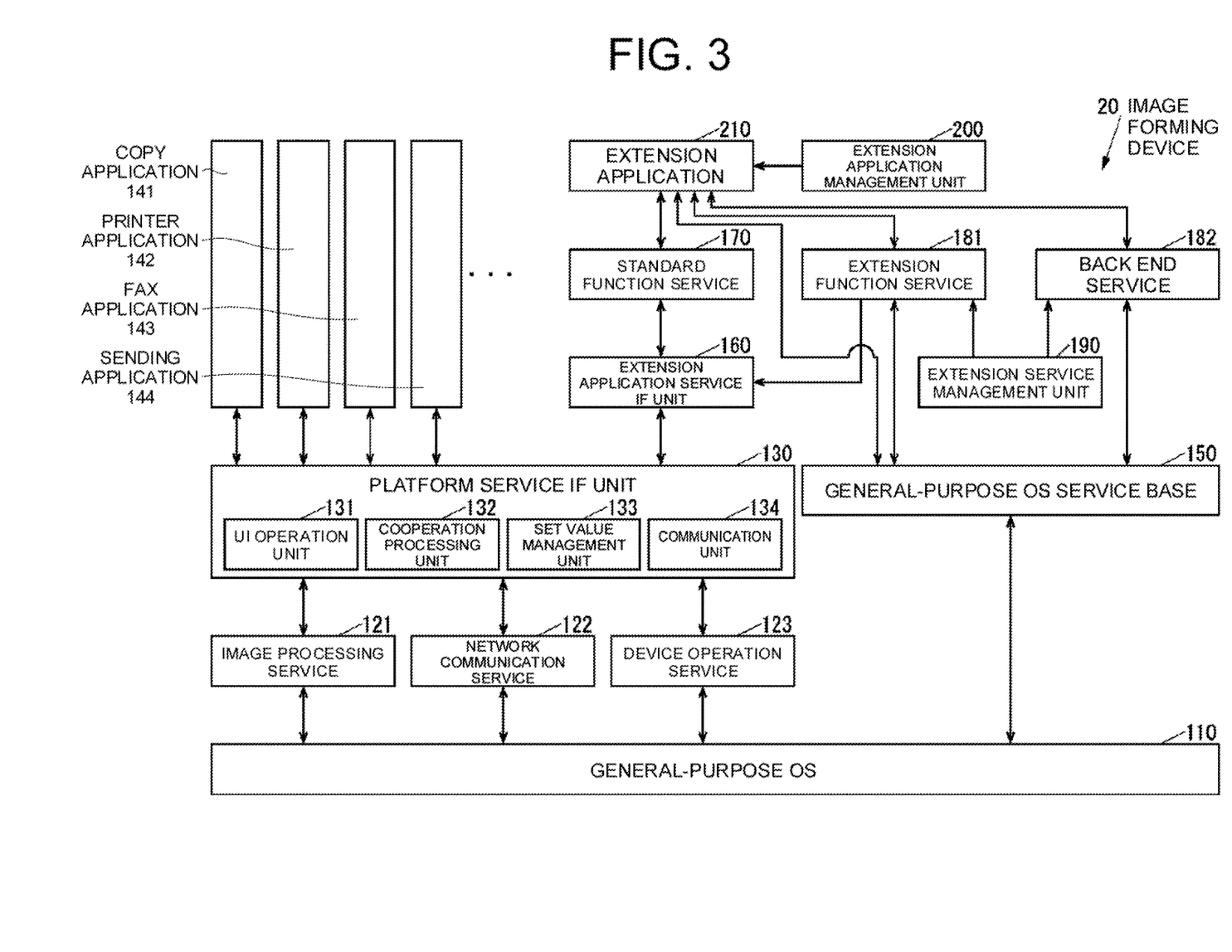
FIG. 3 is a block diagram of control configuration of the image forming device shown in FIG. 2.

The control unit 30 executes the program stored in the storage unit 29 or the ROM, and thereby realizes the control configuration shown in FIG. 3.

FIG. 3 is a block diagram of the control configuration of the image forming device 20.

As shown in FIG. 3, the control unit 30 executes the general-purpose OS program 29*a* (see FIG. 2), and thereby realizes a general-purpose OS 110.

By executing the firmware 29*b* (see FIG. 2), the control unit 30 realizes an image processing service 121 that operates on the general-purpose OS 110 and provides any service related to image processing, a network communication service 122 that operates on the general-purpose OS 110 and provides any service related to the communication via the network, and a device operation service 123 that operates on the general-purpose OS 110 and provides any service for operating each hardware of the image forming device 20. The image processing service 121, the network communication service 122, and the device operation service 123 each control each hardware of the image forming device 20 via the general-purpose OS 110.

The image processing service 121, for example, may provide a service that stores, in the storage unit 29, image data that has been read from a document with resolution, color, and the like set by the scanner 25, and causes the image processing unit 23 to process the image data stored in the storage unit 29. The image processing service 121 may provide a service that, based on a file, draws any image data to be printed by the printer 24. The image processing service 121 may provide a service that executes image processing, such as enlargement, reduction, rotation, color conversion, noise removal, format conversion, character recognition, and watermark recognition, on image data acquired from the extension application, image data read from the document by the scanner 25, or image data stored in the storage unit 29.

The network communication service 122 may provide a service that executes, via the network communication unit 26, file sending/receiving, streaming, and sending/receiving of authentication data by using various protocols such as TCP (Transmission Control Protocol)/IP (Internet Protocol) and UDP (User Datagram Protocol). For example, the network communication service 122 can also send and receive image data read from the document by the scanner 25 and files stored in the storage unit 29. The network communication service 122 can also send/receive image data sent/received by the fax communication unit 27, send/receive the result of user authentication by a user authentication unit when the image forming device 20 has the user authentication unit that authenticates a user by an IC (Integrated Circuit) card or biometric authentication, send/receive image data generated by a camera when the image forming device 20 has a camera. The network communication service 122 can also send and receive the status of each part of the image forming device 20 and the result of invoking the function of each part.

The device operation service 123 may provide a service that executes processes such as drawing on the display unit 22, driving the printer 24, controlling the fax communication unit 27, authenticating a user, and acquiring the status of each hardware of the image forming device 20. The device operation service 123 may, for example, provide a service that stores, in the storage unit 29, image data read from the document by the scanner 25, a service that draws an image on a browser displayed on the display unit 22, a service that sends image data to the printer 24 for image formation, and a service that faxes, by the fax communication unit 27, the image data stored in the storage unit 29. The device operation service 123 may, for example, when an optional device such as a finisher is present in the image forming device 20, provide a service that causes the optional device to execute a process such as bookbinding or stapling, when the user authentication unit that authenticates the user by the IC card or biometric authentication is present in the image forming device 20, provide a service that causes the user authentication unit to execute the user authentication, and when the image forming device 20 has a camera, provide a service that causes the camera to generate image data or invokes each function such as eye detection that is based on the image data generated by the camera. The device operation service 123 may provide a service that executes detailed control of each hardware of the image forming device 20, such as, for example, driving one of the motors of a transport unit of the printer 24. The device operation service 123 may provide a service that acquires the status of each part of the image forming device 20.

By executing the firmware 29b, the control unit 30 realizes a platform service IF unit 130 which provides an interface for invoking the image processing service 121, the network communication service 122, and the device operation service 123. The platform service IF unit 130 has a UI (User Interface) operation unit 131 that detects a login operation by a user, a cooperation processing unit 132 that cooperates with the authentication system, a set value management unit 133 that manages a set value for communication with the authentication system, and a communication unit 134 for communication with the authentication system.

The control unit 30 executes the firmware 29b and thereby executes the standard application. The standard application operates on the platform service IF unit 130 and uses each hardware of the image forming device 20. For example, the control unit 30 realizes a copy application 141, which is a standard application that reads an image from a document by the scanner 25 according to an instruction input to the operation unit 21 and realizes copying of printing the read image by the printer 24, a printer application 142, which is a standard application that prints, by the printer 24, an image that is based on data, such as data described in PDL (Page Description Language), received by the network communication unit 26, a fax application 143, which is a standard application that reads, by the scanner 25, an image from a document according to the instruction input to the operation unit 21 and sends the read image by the fax communication unit 27, and a sending application 144, which reads an image from a document by the scanner 25 according to the instruction input to the operation unit 21 and sends the read image by the network communication unit 26. According to the instruction input to the operation unit 21, the printer application 142, by the printer 24, may print an image that is based on a file stored in the storage unit 29. The fax application 143 may send, by the fax communication unit 27, an image that is based on a file received by the network communication unit 26, may print, by the printer 24, an image received by the fax communication unit 27, or may store, in the storage unit 29, an image received by the fax communication unit 27.

By executing the extension program 29c (see FIG. 2), the control unit 30 realizes a general-purpose OS service base 150 that provides, without via the platform service IF unit 130, a service that uses the general-purpose OS 110. The general-purpose OS service base 150 may provide a service that adds a function to the general-purpose OS 110, such as, for example, installing control programs such as a device driver and a script on the general-purpose OS 110.

By executing the extension program 29c, the control unit 30 realizes an extension application service IF unit 160 which provides, from the extension application side, an interface for using the platform service IF unit 130.

By executing the extension program 29c, the control unit 30 realizes a standard function service 170 which is a service that provides the standard function of the image forming device 20 to the extension application by using the standard application. The standard function service 170 uses the standard application via the extension application service IF unit 160. For example, by using the standard function service 170, the extension application can display, on the display unit 22, a screen of the start of copying by the copy application 141. Further, by using the standard function service 170, the extension application can cause the printer application 142 to print various job data, files, and the like that are acquired by the extension application itself or specified via the operation unit 21. Further, by using the standard function service 170, the extension application can acquire image data specified via the operation unit 21, among the facsimile image data received by the fax application 143, or can cause the fax application 143 to send a file or the like specified via the operation unit 21.

By executing the extension service program (see FIG. 2), the control unit 30 realizes the extension service which is a service that provides a function other than the standard function of the image forming device 20. For example, the control unit 30 realizes an extension function service 181 which is an extension service that provides the extension application with a service that uses the platform service IF unit 130 via the extension application service IF unit 160 without using the standard application or uses the general-purpose OS 110 by using the general-purpose OS service base 150, and a back-end service 182 which is an extension service that provides the extension application with a service that uses the general-purpose OS 110 by using the general-purpose OS service base 150 without using the platform service IF unit 130. The control unit 30 can realize at least one extension function service other than the extension function service 181. The control unit 30 can realize at least one back-end service other than the back-end service 182.

The extension function service is a service that provides the extension application with the function to extend the standard function of the image forming device 20. The extension function services include, for example, a set value management service realized by executing the set value management program 29f, a communication service realized by executing the communication program 29g, and an installation service realized by executing the installation program 29i.

The back-end service is a service that runs at the back-end. The back-end service is a service that provides a function other than the function to extend the standard function of the image forming device 20, of the functions other than the standard function of the image forming device 20. The back-end services include, for example, an external system detection service realized by executing the external system detection program 29h, a service that provides a function to monitor the image forming device 20, a service that provides a function to monitor the entire system including a plurality of image forming devices, a service that provides a function to monitor a specific server, a service that provides a function to collect, from the image forming device 20, information such as a counter indicating the number of copies printed by the image forming device 20, and to cover the collected information into information in a format that can be understood by a human, and a service that provides a function to convert, from an old interface format to a new interface format, a format of information output from the image forming device 20.

By executing the extension program 29c, the control unit 30 realizes an extension service management unit 190 that performs management of the extension service, such as operating, starting and stopping the extension service. The extension service management unit 190 monitors the status of the extension service and the general-purpose OS service base 150.

By executing the extension program 29c, the control unit 30 realizes an extension application management unit 200 that executes management of the extension application, such as operating, starting and stopping the extension application.

By executing the extension application program 29d (see FIG. 2), the control unit 30 realizes an extension application 210. The control unit 30 can realize at least one extension application, other than the extension application 210. The extension application is an application that is used directly by the user and has a user interface. By operating the user interface of the extension application, the user can use the functions provided by this extension application. For example, the extension application may be a practical application such as OCR (Optical Character Recognition), a surveillance camera application, a watermark creation, an invoice creation, an employee list management, a slip management, a contract management, a business card management, a PDF creation, a bookkeeping management, a group management, and the like, may be an installer application that makes additional changes to device drivers, firmware, etc. on the general-purpose OS 110, or may be any other management application. The extension application can invoke the standard function service 170 thereby to use the general-purpose OS 110 by using the standard application, can invoke the extension service thereby to use the general-purpose OS 110 without using the standard application, or can directly invoke the general-purpose OS service base 150 thereby to use the general-purpose OS 110.

Figure 4:
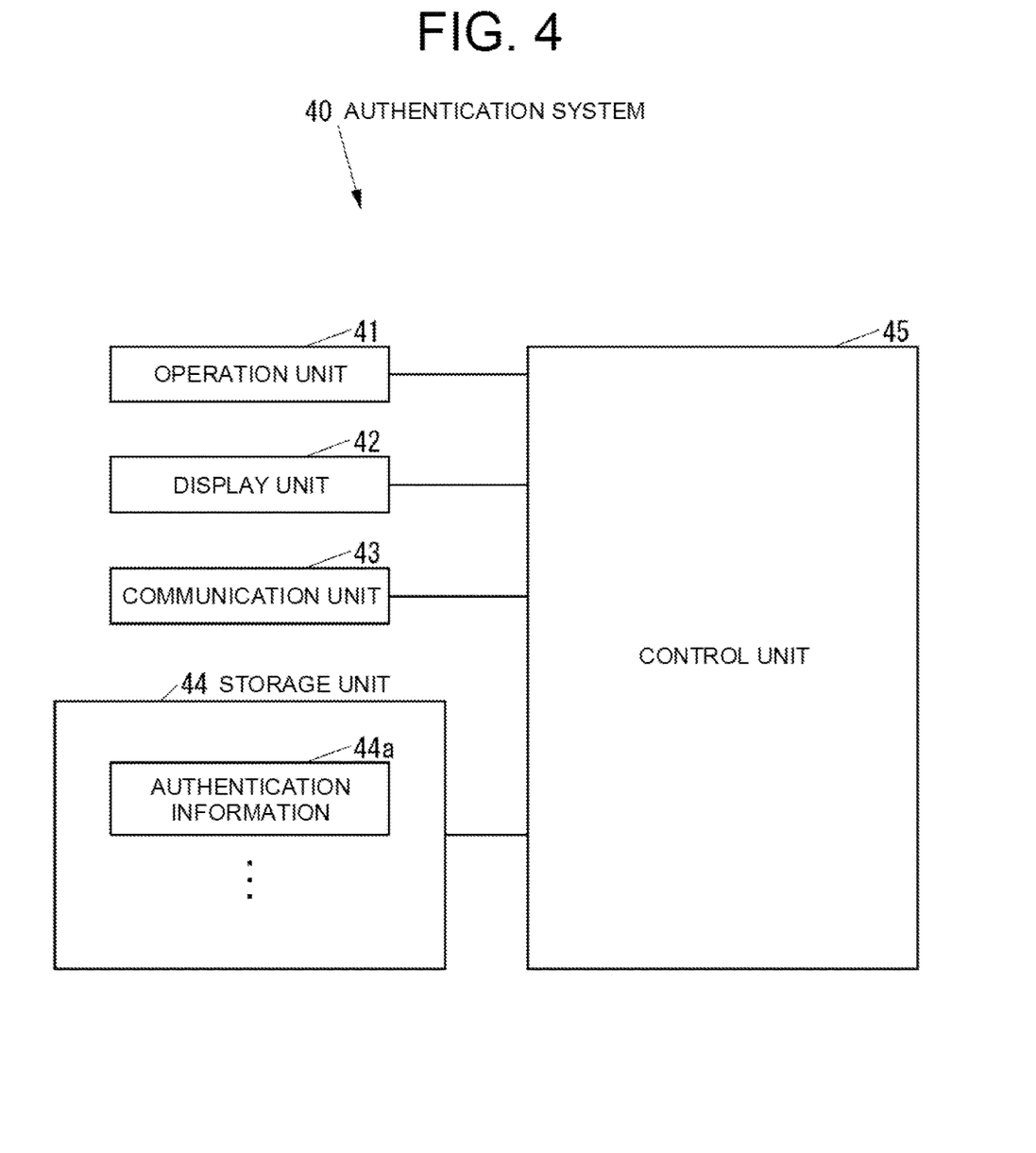
FIG. 4 is a block diagram of an authentication system shown in FIG. 1, when configured by a single computer.

FIG. 4 is a block diagram of the authentication system 40 when configured by a single computer.

As shown in FIG. 4, the authentication system 40 includes an operation unit 41, which is an operation device such as, for example, a button for inputting various operations, a display unit 42, which is a display device such as, for example, an LCD for displaying various information, a communication unit 43, which is a communication device for communication with an external device via a network such as a LAN or the Internet, or directly by wired or wireless means without the network, a storage unit 44, which is a non-volatile storage device such as, for example, a semiconductor memory or HDD for storing various information, and a control unit 45 that controls the entire authentication system 40.

The storage unit 44 can store authentication information 44a for authentication of the user. The storage unit 44 can store the authentication information for each user.

The control unit 45 has, for example, a CPU, a ROM storing a program and various data, and a RAM as a memory used as a work area of the CPU. The CPU executes a program stored in the storage unit 44 or the ROM.

The following explains operation of the system 10.

First, the operation of the image forming device 20 when the set value management program 29f is installed will be described.

When a user, such as an administrator of the image forming device 20, desires to install the set value management program 29f to the image forming device 20, the user can store, in the USB stick, the set value management program desired to be installed on the image forming device 20, and then can mount the USB stick to the USB port 28 of the image forming device 20.

Figure 5:
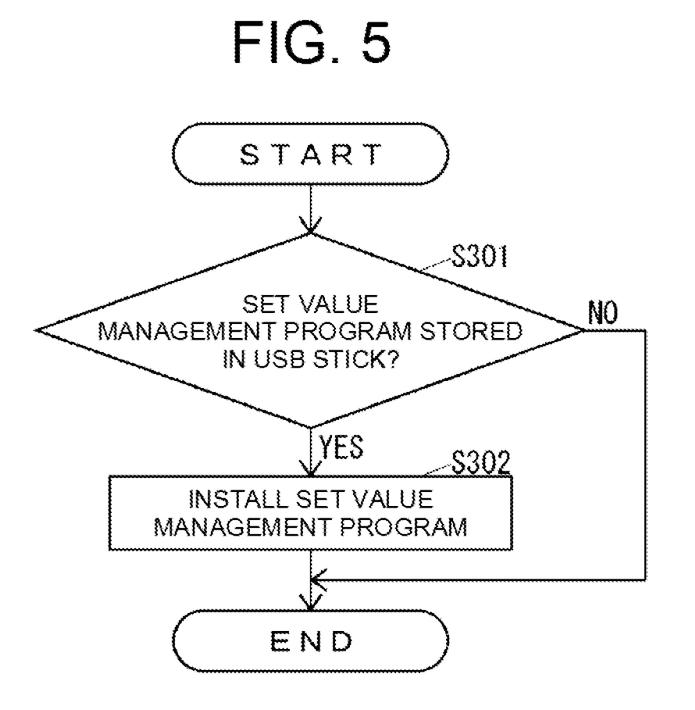
FIG. 5 is a flowchart of the operation of the image forming device shown in FIG. 2, when a set value management program is to be installed.

FIG. 5 is a flowchart of the operation of the image forming device 20 when the set value management program 29f is to be installed.

The extension service management unit 190 of the image forming device 20 starts the installation service when the USB stick is mounted to the USB port 28 of the image forming device 20. When being started, the installation service executes the operations shown in FIG. 5.

As shown in FIG. 5, the installation service determines whether or not the set value management program is stored in the USB stick mounted to the USB port 28 (S301). Here, the installation service accesses the USB stick via the extension application service IF unit 160, the platform service IF unit 130, the device operation service 123, the general-purpose OS 110, and the USB port 28, in that order.

When the installation service determines in S301 that the set value management program is stored in the USB stick mounted to the USB port 28, the installation service installs, in an extension function service area of the storage unit 29, the set value management program stored in the USB stick, as the set value management program 29f (S302). Here, the installation service accesses the storage unit 29 via the extension application service IF unit 160, the platform service IF unit 130, the device operation service 123, and the general-purpose OS 110, in that order.

When the installation service determines in S301 that the set value management program is not stored in the USB stick mounted to the USB port 28, or when the process of S302 is completed, the installation service completes the operation shown in FIG. 5.

In the above, the operation of the image forming device 20 in the case of installing the set value management program 29f is described. However, the same applies to the operation of the image forming device 20 in the case of installing the communication program 29g or the external system detection program 29h.

Next, the operation of the image forming device 20 in the case of detecting the authentication system being connected will be described.

Figure 6:
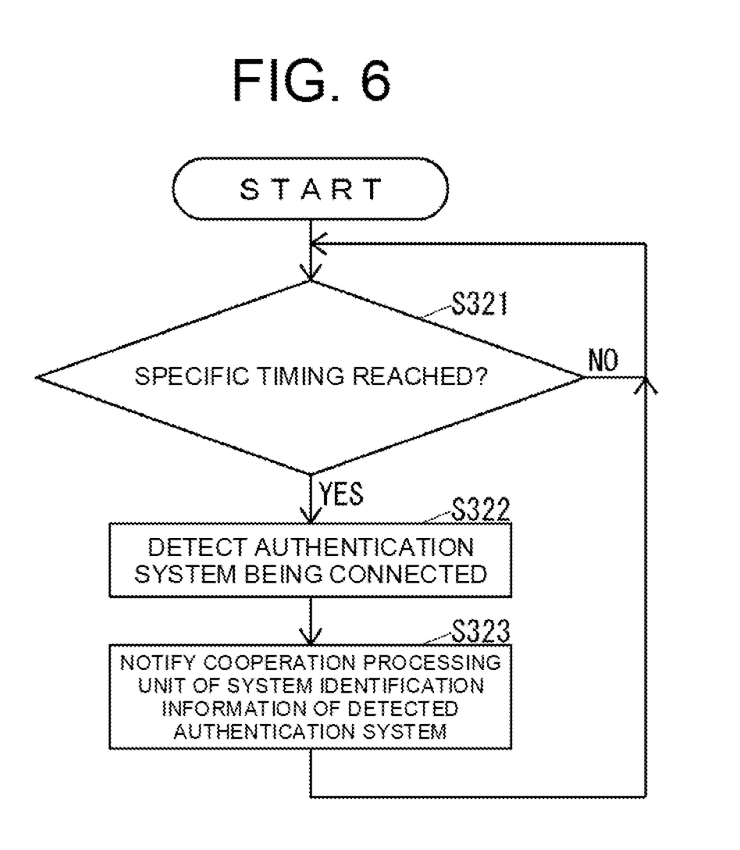
FIG. 6 is a flowchart of the operation of the image forming device in the case of detecting the authentication system being connected.

FIG. 6 is a flowchart of the operation of the image forming device 20 in the case of detecting the authentication system being connected.

As shown in FIG. 6, until determining that specific timing has been reached, the external system detection service, which is realized by the control unit 30 executing the external system detection program 29*h*, determines whether or not the specific timing has been reached (S321). Here, the specific timing is, for example, periodic timing.

When determining in S321 that the specific timing has been reached, the external system detection service detects the authentication system being connected to the image forming device 20 (S322). Here, the external system detection service accesses the authentication system via the extension application service IF unit 160, the platform service IF unit 130, the network communication service 122, the general-purpose OS 110, and the network communication unit 26, in that order. Then, when receiving a reply from the authentication system, the external system detection service determines that the image forming device 20 is being connected to this authentication system.

After the process of S322, the external system detection service notifies the cooperation processing unit 132 of identification information of the authentication system, such as the system name and location of the authentication system detected in S322 (hereinafter referred to as "system identification information") via the extension application service IF unit 160 (S323), and then executes the process of S321.

Next, the operation of the system 10 in the case of a user logging into the image forming device 20 will be described.

Figure 7:
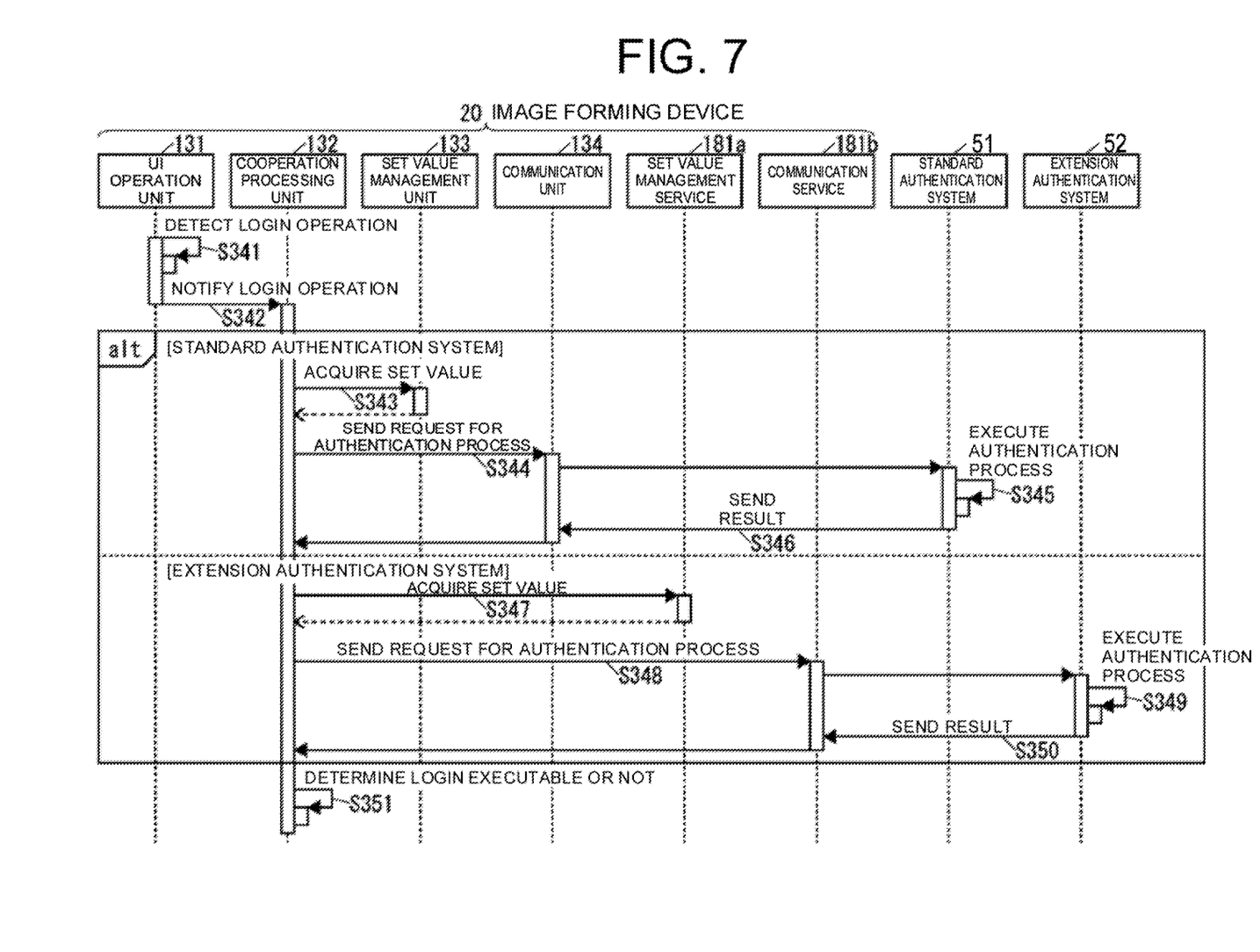
FIG. 7 is a sequence diagram of the operation of the system in the case of a user logging into the image forming device.

FIG. 7 is a sequence diagram of the operation of the system 10 in the case of the user logging into the image forming device 20.

When the user executes a login operation via the operation unit 21, as shown in FIG. 7, the UI operation unit 131 detects the login operation input to the operation unit 21 (S341) and notifies the cooperation processing unit 132 of the login operation detected in S341 (S342).

With the login operation notified in S342, when the authentication system indicated by the latest system identification information notified in S323 is an authentication system (hereinafter referred to as "standard authentication system") 51 having a set value managed in the set value management unit 133 (S343), the cooperation processing unit 132 acquires the set value managed by the set value management unit 133.

Upon acquiring the set value in S343, the cooperation processing unit 132, by the communication unit 134, sends, to the standard authentication system 51, a request for the authentication process that uses the authentication information detected in S341, using the set value acquired in S343 (S344). Here, the communication unit 134 accesses the standard authentication system 51 via the network communication service 122, the general-purpose OS 110, and the network communication unit 26, in that order.

With the request for the authentication process sent from the image forming device 20, the standard authentication system 51 executes the authentication process based on the authentication information included in the request and the authentication information stored by the standard authentication system 51 (S345), and sends the result of the authentication process in S345 to the image forming device 20 (S346).

With the login operation notified in S342, when the authentication system indicated by the latest system identification information notified in S323 is not the standard authentication system 51, i.e., is an authentication system (hereinafter referred to as "extension authentication system") 52 having a set value managed in a set value management service 181*a*, the cooperation processing unit 132 acquires, via the extension application service IF unit 160, the set value managed by the set value management service 181*a* (S347). By inquiring the set value management service 181*a*, the cooperation processing unit 132 determines whether the authentication system indicated by the latest system identification information notified in S323 is the extension authentication system.

Upon acquiring the set value in S347, the cooperation processing unit 132, by a communication service 181*b*, sends, to the extension authentication system 52 via the extension application service IF unit 160, a request for the authentication process that uses the authentication information detected in S341, using the set value acquired in S347 (S348). Here, the communication service 181*b* accesses the extension authentication system 52 via the extension application service IF unit 160, the platform service IF unit 130, the network communication service 122, the general-purpose OS 110, and the network communication unit 26, in that order.

With the request for the authentication process sent from the image forming device 20, the extension authentication system 52 executes the authentication process based on the authentication information included in the request and the authentication information stored by the extension authentication system 52 (S349), and sends the result of the authentication process in S349 to the image forming device 20 (S350).

When receiving the result of the authentication process by the standard authentication system 51 via the communication unit 134 or receiving the result of the authentication process by the extension authentication system 52 via the communication service 181*b*, the cooperation processing unit 132 of the image forming device 20 determines, based on the received result of the authentication process (S351), whether or not the user can log in. That is, the cooperation processing unit 132 permits the user to log in when the result of the authentication process is a success of authentication, and does not permit the user to log in when the result of the authentication process is a failure of authentication.

As explained above, while the program for the set value management unit 133 that manages the set value for communication with the standard authentication system 51 is included in the firmware 29*b*, the set value management program 29*f*, which is a program for the set value management service 181*a* that manages the set value for communication with the extension authentication system 52 is a program different from the firmware 29*b*, therefore, even when the firmware 29*b* is not updated, merely updating the set value management program 29*f* can customize the image forming device 20 regarding the cooperation with the authentication system. That is, the image forming device 20 can improve the customizability regarding the cooperation with the authentication system. Therefore, as compared with a configuration in which the firmware 29*b* of the image forming device 20 needs to be updated so as to execute the customization regarding the cooperation with the authentication system, the image forming device 20 can shorten the development period of the software for executing the customization regarding the cooperation with the authentication system.

While the program for the communication unit 134 that communicates with the standard authentication system 51 is included in the firmware 29*b*, the communication program 29*g*, which is the program for the communication service 181*b* that communicates with the extension authentication system 52, is a program different from the firmware 29*b*, therefore, even when the firmware 29*b* is not updated, merely updating the communication program 29*g* can customize the image forming device 20 regarding the cooperation with the authentication system.

The external system detection program 29*h*, which is a program for the external system detection service that detects the authentication system being connected to the image forming device 20, is a program different from the firmware 29*b*, therefore, even when the firmware 29*b* is not updated, merely updating the external system detection program 29*h* can customize the image forming device 20 regarding the cooperation with the authentication system.

The set value management program 29*f* is a program different from the firmware 29*b* of the image forming device 20. Therefore, the image forming device 20 is designed so that, when the operation of the image forming device 20 is adversely affected by the installation of the set value management program 29*f*, removing the set value management program 29*f* can easily normalize the operation of the image forming device 20. Although the set value management program 29*f* has been described, the same applies to the communication program 29*g* and the external system detection program 29*h*.

The image forming device 20 is provided with the communication service 181*b* that communicates with the extension authentication system 52, separately from the communication unit 134 that communicates with the standard authentication system 51. Therefore, even when the communication method with the extension authentication system 52 is different from that with the standard authentication system 51, the image forming device 20 can properly communicate with the extension authentication system 52. However, when the communication method with the standard authentication system 51 and the communication method with the extension authentication system 52 are the same, accomplishing a communication between the extension authentication system 52 and the communication unit 134 eliminates the need of the image forming device 20 to be provided with the communication service 181*b*.

In this embodiment, when the USB stick storing the extension service program is mounted to the USB port 28, the image forming device 20 installs the program. However, the image forming device 20 may install the extension service program by any other method. For example, the image forming device 20 may install this program when a storage device, other than the USB stick, that is storing the extension service program is connected.

Any of a plurality of programs in this embodiment may be configured as a single program. For example, the firmware 29*b* and the extension program 29*c* may be configured as a single program. Further, at least two of the set value management program 29*f*, the communication program 29*g*, and the external system detection program 29*h* may be configured as a single program.

Although being the authentication system in the present embodiment, the external system of the present disclosure can also be a system other than the authentication system, for example, a system that provides address book data to the image forming device.

Although being the image forming device in the present embodiment, the electronic device of the present disclosure can also be an electronic device, other than an image forming device, such as, for example, a PC (Personal Computer).

What is claimed is:

1. An electronic device that cooperates with an external system, comprising:
   a cooperation processing unit that cooperates with the external system;
   a set value management unit that manages a set value for communication with a first external system as the external system; and
   a set value management service that manages the set value for communication with a second external system as the external system,
   wherein
   in a case where the first external system is being connected to the electronic device, the cooperation processing unit uses the set value managed by the set value management unit to cooperate with the first external system, and in a case where the second external system being connected to the electronic device, the cooperation processing unit uses the set value managed by the set value management service to cooperate with the second external system,
   the cooperation processing unit and the set value management unit are provided by firmware of the electronic device, and
   the set value management service is provided by an extension service for providing a function other than a standard function of the electronic device, the extension service being not included in the firmware.

2. The electronic device according to claim 1, comprising:
   a communication unit that communicates with the external system, and
   a communication service that communicates with the external system,
   wherein
   in a case where the first external system is being connected to the electronic device, the cooperation processing unit uses the communication unit thereby to cooperate with the first external system, and in a case where the second external system is being connected to the electronic device, the cooperation processing unit uses the communication service thereby to cooperate with the second external system, and
   the communication unit is provided by the firmware, and the communication service is provided by the extension service.

3. The electronic device according to claim 1, comprising:
   an external system detection service that detects the external system being connected to the electronic device,
   wherein
   based on a result of detection by the external system detection service, the cooperation processing unit determines whether the external system being connected to the electronic device is the first external system or the second external system, and
   the external system detection service is provided by the extension service.

4. A non-transitory computer-readable recording medium recording firmware executable by a computer of an electronic device that cooperates with an external system,
   wherein
   the firmware includes:
   a program for a cooperation processing unit that cooperates with the external system, and a program for a set value management unit that manages a set value for communication with a first external system as the external system, when the firmware is executed, the firmware causes the computer to operate as the cooperation processing unit and the set value management unit, in a case where the first external system is being connected to the electronic device, the cooperation processing unit uses the set value managed by the set value management unit to cooperate with the first external system, and in a case where a second external system as the external system is being connected to the electronic device, the cooperation processing unit uses a set value managed by a set value management service that manages the set value for communication with the second external system, to cooperate with the second external system, and a program for the set value management service is included in a program for an extension service that provides a function other than a standard function of the electronic device, the program for the extension service being not included in the firmware.

5. An electronic device that cooperates with an external system, comprising:

an external system detection service that detects the external system being connected to the electronic device;

a cooperation processing unit that cooperates with the external system in accordance with a result of detection by the external system detection service;

a set value management unit that manages a set value for communication with a first external system as the external system; and a set value management service that manages the set value for communication with a second external system as the external system, wherein in a case where the external system detection service detects that the first external system is being connected to the electronic device, the cooperation processing unit uses the set value managed by the set value management unit to cooperate with the first external system, and in a case where the external system detection service detects that the second external system is being connected to the electronic device, the cooperation processing unit uses the set value managed by the set value management service to cooperate with the second external system, the cooperation processing unit and the set value management unit are provided by firmware of the electronic device, and the external system detection service and the set value management service are provided by an extension service for providing a function other than a standard function of the electronic device, the extension service being not included in the firmware.

* * * * *